GRID WINDING

Filed Feb. 19, 1963

INVENTOR
Andrew Szilasi
Goliardo Miale
BY
ATTORNEY

United States Patent Office 3,212,532 Patented Oct. 19, 1965

3,212,532
GRID WINDING

Andrew Szilasi and Goliardo Miale, Bath, N.Y., assignors to Westinghouse Electric Corporation, Pittsburgh, Pa., a corporation of Pennsylvania Filed Feb. 19, 1963, Ser. No. 259,617
9 Claims. (Cl. 140—71.5)

The present invention relates generally to frame grids, and more particularly to a method and apparatus utilized in the winding of frame grids.

Most presently manufactured frame grids are comprised of a frame including two substantially parallel side rods maintained in a spaced relationship by a plurality of cross members extending between and affixed to the side rods. The cross bars may be affixed to the side rods by any suitable means, for example welding. A plurality of successive turns or laterals are wound around the side rods to form the so called active grid portion. While molybdenum is the material most commonly used for these frames, and despite molybdenum's high strength, a frame thus made can not be considered as rigid. This is especially true in the smaller sized grids in which the side rods often have diameters of approximately 0.030 inch. Inasmuch as the concentration of laterals is normally quite high, and inasmuch as the laterals are, for the most part, retained in position by frictional forces, requiring that the grid lateral wire be wound under tension, the effect is that there often occurs a slight amount of inward bowing of the side rods. This bowing of the side rods would not be particularly objectionable if it were not for the side effect of the loosening of some of the lateral wires. This can be explained by the fact that after one part of the grid is wound, the following lateral wires will pull the side rods in further thus loosening the previously wound lateral wires. Measurements have shown that wires wound with about ten grams tension per wire often result in a finished grid in which some of the wires are maintained on the side rods by only about one or two grams tension per wire. Side rods have been measured to move towards one another by about .001 to .002 inch. The obvious result in a thus wound frame grid structure is that the lateral wires do not retain the tension with which they were wound and such a reduction in tension degrades the microphonic characteristics of the tube. In addition, laterals with this reduced tension are easily shifted resulting in a non-uniform active grid area. Further, the geometry of these frame grids is ideally one where the laterals lie in a plane tangent to the side rods. The relaxation of tension described above permits the laterals to deviate outwardly from their ideal location. This deviation is harmful to tube performance.

It is, therefore, an object of the present invention to provide an improved method of winding frame grids.

Another object is to provide improved apparatus for the winding of frame grids.

A still further object is to provide improved means, adaptable to standard grid winding machinery, to facilitate the winding frame type grids.

A still further object is to provide improved means and methods for the winding of frame grids whereby the problems associated with the bowing of the side rods are alleviated.

Stated briefly, the present invention provides a device for slidably retaining a frame grid strip including a pair of side rods maintained in a spaced relationship by a plurality of cross bars extending therebetween. This device may be mounted on a rotating spindle or head of any convenient grid winding machine or it may be maintained stationary. In either case, the grid strip is gripped at one end and drawn through the device. As the strip is so drawn, force means associated with the device, acting on at least one of the side rods, serves to cause an inward bending of the side rods at a point prior to that at which the grid laterals are wound upon the side rods. The amount of force applied by the aforementioned force means is insufficient to exceed the elastic limit of the side rods. Therefore, the method of the present invention provides that, prior to winding the grid laterals on the grid frame side rods, the side rods are bowed inwardly to prestress its frame. As the lateral wires are progressively wound on an individual grid frame, the prestress force is reduced at any particular point by virtue of this point moving from under and away from the prestressing force. The performance of this method provides a completed grid with greater tension in the lateral wires than a grid wound without the prestressing feature.

Further objects and advantages of the invention will become apparent as the following description proceeds, and features of novelty which characterize the invention will be pointed out in particularlity in the claims annexed to and forming a part of this specification.

For a better understanding of the invention, reference may be had to the accompanying drawings, in which.

Figure 1:
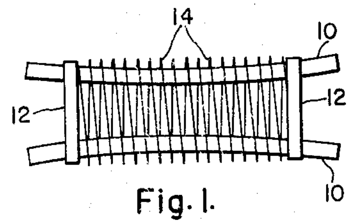
FIGURE 1 is a top plan view of a frame grid which was not made by the device or in accordance with the method of the present invention and in which the bowing of the side rods, and consequently the loosening of the laterals, has been greatly exaggerated for purposes of illustration.

With reference now to FIGURE 1, there is shown a frame grid not wound by the device or method of the present invention. As shown, the grid includes a pair of side rods 10 which are maintained in a spaced relationship by a plurality of cross bars 12 extending between and affixed to the side rods 10. The side rods 10 are positioned such that their longitudinal axes are substantially coplanar. A plurality of grid turns or laterals 14 are wound around the side rods 10 between two or more cross bars 12 to provide the active grid portion. In FIGURE 1, the side rods 10 are shown bowed towards one another. The amount of bowing of the side rods 10, which has been greatly exaggerated for purposes of illustration, results from the fact that as the laterals are placed on the side rods, they are done so under tension. This winding under tension results in the accumulative effect that as successive grid laterals 14 are wound on the grid, the tendency is for the side rods to bend and hence the previously wound turns or laterals 14 are only loosely held by the side rods 10. The resultant structure is one in which the laterals positioned closely adjacent the cross members 12, which serve to keep the side rods accurately spaced, are held fairly tightly while due to the bending of the side rods 10 those laterals near the center of the active grid portion are rather loosely held. In one example of a grid thus made, measurements showed that with a winding tension of about 10 grams the tension of the centrally disposed turns of the completed grid was about two grams.

Figure 2:
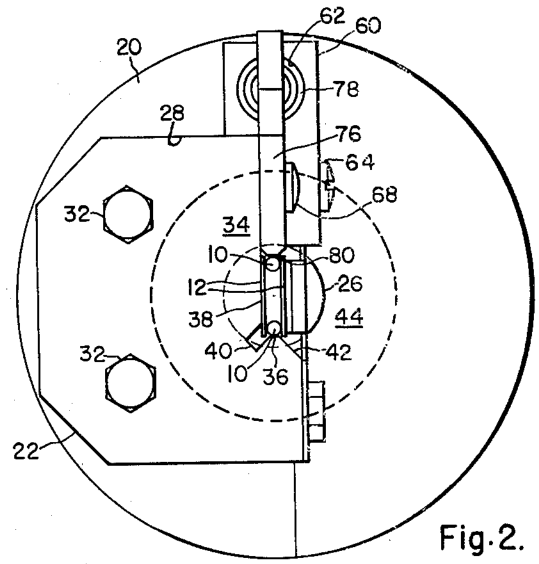
FIGURE 2 is a front elevational view, partially broken away, of a device in accordance with the present invention.
Figure 3:
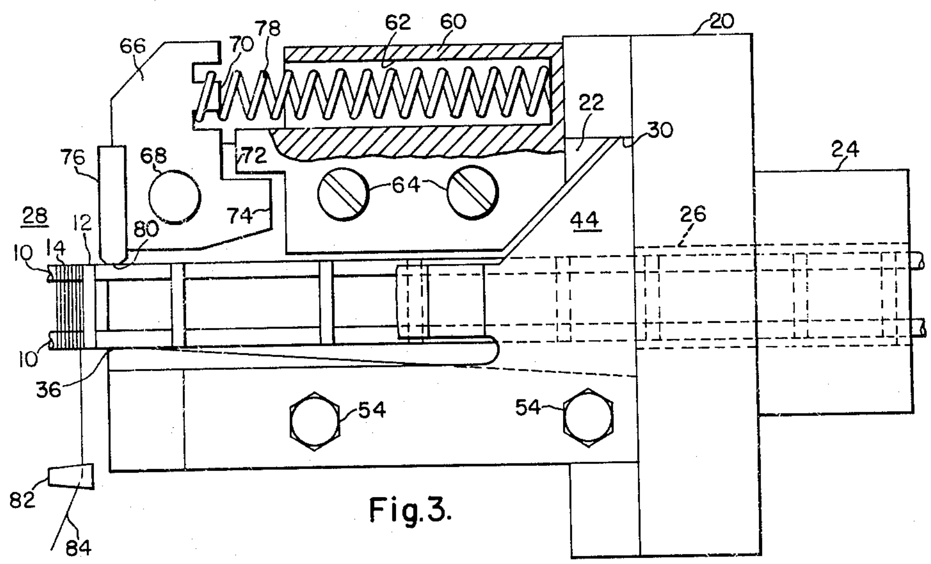
FIGURE 3 is a side elevational view, partially in section and partially broken away, of the device of FIGURE 2.
Figure 4:
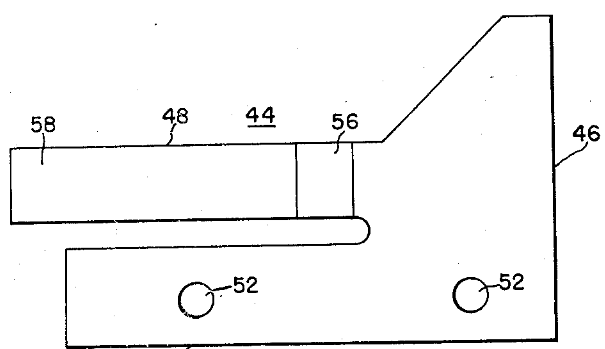
FIGURE 4 is a side elevational view of one of the components of the device of FIGURES 3 and 2.

With reference now to FIGURES 2, 3 and 4, there is shown, in accordance with the present invention, a device for holding a frame grid strip and for the winding of laterals thereon in accordance with the method of the present invention. The embodiment shown is one of convenient design which is adapted for mounting on the rotating head or spindle of a conventional grid making machine, for example, a lathe such as that described in the United States Patent No. 2,441,228 issued May 11, 1948.

The device comprises a base member 20 which serves as a suitable platform to which a support member 22 is attached. The base 20 is preferably cylindrical in shape, of a suitable material such as steel, and is provided with a rearwardly extending portion 24 which may be press-fitted into a hollow rotating spindle of the grid winding machine. The base 20 is also provided with a centrally extending bore 26 to permit the longitudinal passage of a frame grid strip 28 therethrough. The frame grid strip 28 is comprised of a pair of spaced side rods 10 which are maintained in their relative positions by a plurality of cross bars 12 extending therebetween. The frame grid strip 28 is comprised of a plurality of units such as was illustrated in FIGURE 1 and in actuality, the units illustrated in FIGURE 1 are produced by severing the frame grid strip at the proper places after the entire strip has been wound with grid laterals. It will, of course, be obvious to the reader that the principles set forth in this writing have equal application to the manufacture of a single frame unit.

A suitable recess 30 is provided in the top surface of the base member 20. The support member 22 is disposed within the recess and is affixed to the base member 20 by suitable means, for example, a pair of screws 32 which extend longitudinally through the support member 22 and are secured in the base member 20. One side of the support member 22 is provided with an offset portion, indicated generally at 34, and the member 22 is placed so that the offset portion 34 is positioned over the centrally extending bore 26 of the base member 20. As illustrated, the offset portion 34 provides first and second fixed surfaces 36 and 38 which are positioned in planes substantially perpendicular to one another and which extend longitudinally along at least a portion of the length of the support member 22. These two surfaces 36 and 38 serve as fixed references against which the grid strip 28 is maintained in a slidable fashion.

The fixed surface 38 provided the fixed reference surface against which the cross members 12 of the grid strip 28 are maintained. The lower of the two side rods 10 is positioned in contact with the lower fixed surface 36. A suitable recess 40 is provided between the fixed surfaces 36 and 38 so that in the event any of the cross bars 12 of the grid strip 28 extend beyond the side rods 10, they do not touch either of the fixed surfaces. In like manner, the fixed surface 36 is provided with a beveled edge 42, so that the cross bars on the other side of the side rod 10 do not touch the fixed surface 36. In the illustrated embodiment, the fixed surface 36 has a width slightly smaller than the diameter of the side rods.

The frame grid strip 28 is maintained against the fixed surface 38 by a resilient or spring means indicated generally at 44. For purposes of clarity, the resilient means 44 has been shown partially broken away in FIGURE 3 and may best be seen with respect to FIGURE 4. Resilient means 44 is comprised as a main portion 46 and two leg portions 48 and 50. The means 44 is provided with two or more holes 52 in its lower portion and is secured to the support member 22 by means of suitable fastening means, for example, screws 54. Leg 48 is bent at 56 to provide that the outer portion 58 of the leg 48 lies in a plane substantially parallel but slightly displaced from the plane of the body portion 46 of the member 44. The leg 48 is preferably slightly smaller in width than the width of the grid strip 28 and also preferably has a length sufficient to span, at any one time, a plurality of cross bars 12 of the grid strip 28. The member 44 is supported by the support member 22 and is positioned so that the distance between the fixed surface 38 and the leg portion 58 is slightly less than the combined thickness of the cross bars 12 and the side rods 10. In this manner, the resilient member 44 serves to maintain the grid strip 28 firmly against the fixed surface 38. It is noted that the fixed surface 36 has only a relatively small area of longitudinal contact with the grid strip 28. The reason for this relatively small area of contact will be more fully explained and understood as this description proceeds.

Positioned above the grid strip 28 and secured to the support member 22 by suitable means, for example screws 64, is a block 60. The block 60 is provided with a bore 62 which extends into the upper portion thereof.

There is also provided above the grid strip 28 a lever or force means 66 which is pivotally secured to the support member 22 by suitable means for example, a pivot pin 68. On the side of the force means 66 nearest the block 60 there is provided a projection 70 around which is fitted a compression spring 78 which extends into the bore 62 of the block 60. The spring 78 serves to give the force means 66 a rotational movement about the pivot 68 in the counterclockwise direction. Suitable stop means 72 and 74, located respectively on the block 60 and the force means 66, are provided to limit the extent of this rotational movement. Located at the forward (left in the illustrated embodiment) edge of the force means 66 and extending slightly below the bottom thereof, there is provided a replaceable contacting means 76. The contacting means 76 is secured to the force means 66 by any suitable means, for example, brazing. The contacting means 76 is made of a hard, wear resistant material. The means 76 could, of course, be merely a portion of the member 66 but for repair (wear replacement), the removable portion is preferable. A lower edge 80, of the element 76, has a width which does not exceed the diameter of the side rod 10 and extends longitudinally along the length of the grid strip 28 a distance which corresponds to that distance which the fixed surface 36 so extends. The spring means 78 provides sufficient force acting through the means 66 and the contacting means 76 upon the upper side rod 10 to effect a slight bowing thereof and, inasmuch as the fixed surface 36 is directly below the lower edge 80 of the insert 76, the bowing of the lower side rod 10 is approximately equal to that of the upper side rod 10. It should be here noted that the amount of bowing provided preferably does not exceed the elastic limits of the side rods.

In the winding operation, one end of the grid strip 28 is attached to suitable means, such as a draw bar (not shown) which provides the strip 28 with both rotary motion about and linear motion along its longitudinal axis. The lathe spindle, and hence the holding device of the present invention which is secured to the spindle, is rotated at a speed synchronous to that of the draw bar. A suitable means 82 for directing grid lateral wire 84 onto the strip 28 is positioned at a point near to the surfaces 80 and 36.

By the proper selection of the spring 78, the amount of bowing of the side rod 10 can be made to simulate that which would exist in a grid frame when all the laterals retain the tension with which they are wound. The amount of bowing will, of course, be greatest near the center of the active grid portion. After the strip has passed the surfaces 80 and 36, the pressure removed and the laterals 14 wound, the natural elasticity of the side rods 10 will cause these rods to attempt to return to their original position and hence increase the tension on the lateral wires above that which they would have had, had the side rods not been deflected inwardly prior to and during their winding. In this manner, it has been found that grids may be wound with substantially uniform tension on all laterals.

The distance between the point of winding and the point of applying pressure to the side rods is important although not particularly critical, practice has shown that very good results are achieved when this distance is in the range of from approximately ⅓ to ⅙ of the length of the active grid portion. Experimentation with any particular set of parameters will indicate what exactly is the best setting in any particular case.

It is thus seen that there has been provided a method and apparatus which when utilized for the winding of frame grids produces a grid in which all of the laterals are maintained under approximately the same tension.

While there has been shown and described what are at present considered to be the preferred embodiments of the invention, modifications thereto will readily occur to those skilled in the art. For example, while the device is illustrated with one fixed and one movable surface acting respectively on the two side rods, it is readily apparent that two such movable sections, one on each side rod, could be utilized. It is also realized that the particular configuration of force means shown is subject to a great number of modifications.

It is not desired, therefore, that the invention be limited to the specific arrangements shown and described and it is intended to cover in the appended claims all such modifications as fall within the true spirit and scope of the invention.

We claim as our invention:

1. A method of winding frame grids comprising the steps of providing a source of lateral wire and a grid frame including a pair of side rods spaced from each other a given distance by a plurality of cross bars extending between said side rods, providing relative rotational and longitudinal motions between said wire source and said grid frame whereby said lateral wire is removed from said source and wound onto said grid frame to form successive turns thereon, maintaining said lateral wire under tension during the period said turns are formed, and applying a force to at least one of said pair of side rods prior to the winding of said turns to decrease said given distance and to thereby maintain said turns about said pair of side rods under tension.

2. A method of winding frame grids comprising the steps of providing a source of lateral wire and a grid frame including a plurality of side rods maintained in a spaced relationship by a plurality of cross bars extending between said side rods, providing relative rotational and longitudinal motions between said wire source and said grid frame whereby wire is removed from said source and wound onto said grid frame to form successive turns thereon, maintaining said lateral wire under tension during the period said turns are formed, and providing a temporary deformation to said side rods towards each other while winding said turns, said deformation not exceeding the elastic limit of said side rods to thereby maintain said wound turns under tension.

3. A method of winding frame grids comprising the steps of providing a source of lateral wire and a grid frame including a pair of side rods spaced from each other a given distance by a plurality of cross bars extending between said side rods, providing relative rotational and longitudinal motions between said wire source and said grid frame whereby wire is removed from said source and wound onto said grid frame to form successive turns thereon, maintaining said lateral wire under tension during the period said turns are formed, and applying a force to at least one of said side rods sufficient to decrease said distance but insufficient to effect a substantial permanent deformation of said side rods to maintain said turns of wound lateral wire under tension.

4. A method of winding frame grids comprising the steps of providing a source of lateral wire and a grid frame including a plurality of side rods maintained in a spaced relationship by a plurality of cross bars extending between said side rods, providing relative rotational and longitudinal motions between said wire source and said grid frame whereby wire is removed from said source and wound onto said grid frame to form successive turns thereon, maintaining said lateral wire under tension during the period said turns are formed, and applying a force to at least one of said side rods sufficient to cause the deformation of said side rods in a direction towards each other but insufficient to effect a substantial permanent deformation of said side rods, said force being applied at a distance in the range of from approximately 1/6 to 1/3 the length of the grid from the point of application of said wire to said side rods.

5. A method of winding frame grids comprising the steps of providing a source of lateral wire and a grid frame including a plurality of side rods maintained in a spaced relationship by a plurality of cross bars extending therebetween, providing relative rotational and longitudinal motions between said wire source and said grid frame whereby wire is removed from said source and wound onto said grid frame to form successive turns thereon, maintaining said lateral wire under tension during the period said turns are formed, and applying a force to at least one of said side rods sufficient to cause the bowing thereof, said force being applied to said side rod at a point which longitudinally traverses said grid frame at approximately the same rate as that of the application of said turns whereby the distance between the point of force and place of winding said turns is maintained substantially constant.

6. A method of winding grids of the type having a frame including a plurality of side rods maintained in a spaced relationship by a plurality of cross bars extending between said side rods and a plurality of successive lateral wires supported by and frictionally maintained on said side rods comprising the steps of providing a source of wire, imparting to said frame both rotational and longitudinal motion with respect to said source of wire whereby wire is removed from said source and disposed in successive turns on said side rods, maintaining said wire under tension during said winding operation, and maintaining said side rods in an inwardly bowed condition during the period of winding said turns to thereby maintain said turns of wound lateral grid wire under tension.

7. A method of winding grids of the type having a frame including a pair of side rods spaced a given distance apart by a plurality of cross bars extending between said side rods and a plurality of successive lateral wires supported by said side rods comprising the steps of providing a source of wire, imparting to said frames both rotational and longitudinal motion with respect to said source of wire whereby wire is removed from said source and disposed in successive turns on said side rods, maintaining said wire under tension during said winding operation, applying a pressure prior to the winding of said turns to at least one of said pair of side rods to decrease said given distance, and releasing said pressure after said turns are wound about said pair of side rods to maintain said turns under tension.

8. A method of winding grids of the type having a frame including a plurality of side rods maintained in a spaced relationship by a plurality of cross bars extending between said side rods and a plurality of successive laterals supported by and frictionally maintained on said side rods comprising the step of providing a source of wire, imparting to said frame both rotational and longitudinal motion with respect to said source of wire whereby wire is removed from said source and disposed in successive turns on said side rods, maintaining said wire under tension during said winding operation, applying a force to at least one of said side rods sufficient to cause the bowing thereof but insufficient to effect a substantial permanent deformation of said side rods, and releasing said force after said turns have been wound about said side rods to induce a uniform tension upon said turns.

9. A method of winding grids of the type having a frame including a plurality of side rods maintained in a spaced relationship by a plurality of cross bars extending between said side rods and a plurality of successive laterals supported by said side rods comprising the step of providing a source of wire, imparting to said frame both rotational and longitudinal motion with respect to said source of wire whereby wire is removed from said source and disposed in successive turns on said side rods, maintaining said wire under tension during said winding operation, and applying a force during the period of winding said turns to at least one of said side rods sufficient to cause the bowing thereof but insufficient to effect a substantial permanent deformation of said side rods, said force being applied at a distance in the range of from approximately 1/6 to 1/3 the length of the grid from the point of application of said wire to said side rods.

References Cited by the Examiner

UNITED STATES PATENTS

| | | | |
|---|---|---|---|
| 2,176,918 | 10/39 | Narwid | 140—71.5 |
| 2,176,919 | 10/39 | Narwid | 140—71.5 |
| 2,176,920 | 10/39 | Narwid | 140—71.5 |
| 2,385,973 | 10/45 | Eitel | 140—92.1 |
| 2,820,487 | 1/58 | Bahm | 140—71.5 |
| 2,853,104 | 9/58 | Johnson | 140—71.5 |
| 3,063,475 | 11/62 | Possis et al. | 140—92.1 |

CHARLES W. LANHAM, *Primary Examiner.*